United States Patent [19]

Hareng et al.

[11] Patent Number: 4,500,878
[45] Date of Patent: Feb. 19, 1985

[54] THERMOELECTRICALLY CONTROLLED ELECTROCHROMATIC VISUALIZATION DEVICE

[75] Inventors: Michel Hareng; Paul Moutou, both of Paris, France

[73] Assignee: Thomson-CSF, Paris, France

[21] Appl. No.: 424,762

[22] Filed: Sep. 27, 1982

[30] Foreign Application Priority Data

Dec. 15, 1981 [FR] France ............... 81 23437

[51] Int. Cl.³ .............................. G09G 3/34
[52] U.S. Cl. ................... 340/713; 340/714; 340/785; 340/786
[58] Field of Search ............. 340/713, 714, 785, 786, 340/763; 350/392, 398, 357

[56] References Cited

U.S. PATENT DOCUMENTS

| | | | |
|---|---|---|---|
| 3,614,526 | 10/1971 | Janning | 340/714 |
| 4,201,985 | 5/1980 | Inami et al. | 340/785 |
| 4,294,519 | 10/1981 | Hashimoto | 340/785 |
| 4,297,695 | 10/1981 | Marshall | 350/357 |

FOREIGN PATENT DOCUMENTS

| | | | |
|---|---|---|---|
| 2932252 | 2/1981 | Fed. Rep. of Germany | 340/713 |
| 1594584 | 7/1970 | France . | |
| 1600894 | 9/1970 | France . | |
| 2373076 | 6/1978 | France . | |
| 0103366 | 8/1979 | Japan | 340/785 |
| 0119897 | 9/1979 | Japan | 340/713 |
| 945648 | 1/1964 | United Kingdom . | |
| 0842890 | 7/1981 | U.S.S.R. | 340/713 |

OTHER PUBLICATIONS

Applied Physics Letters, vol. 37, No. 10, Nov. 15, 1980, New York "Temperature Dependence of Electrochromic Processes in Iridium Oxide Displays", pp. 965-967.

Primary Examiner—Gerald L. Brigance
Attorney, Agent, or Firm—Oblon, Fisher, Spivak, McClelland & Maier

[57] ABSTRACT

An electrically controlled visualization device comprising an electrochromatic material placed between a first electrode and a second electrode, said electrodes being supported respectively by two plates at least one of which is transparent, and said electrodes being connected to a voltage source adapted to produce a displacement of ions by diffusion which modifies the aspect of the said material, wherein an electric heating current passes through one of said electrodes, the duration of the application of said voltage being selected in such as a manner that said displacement is dependent on said current.

6 Claims, 3 Drawing Figures

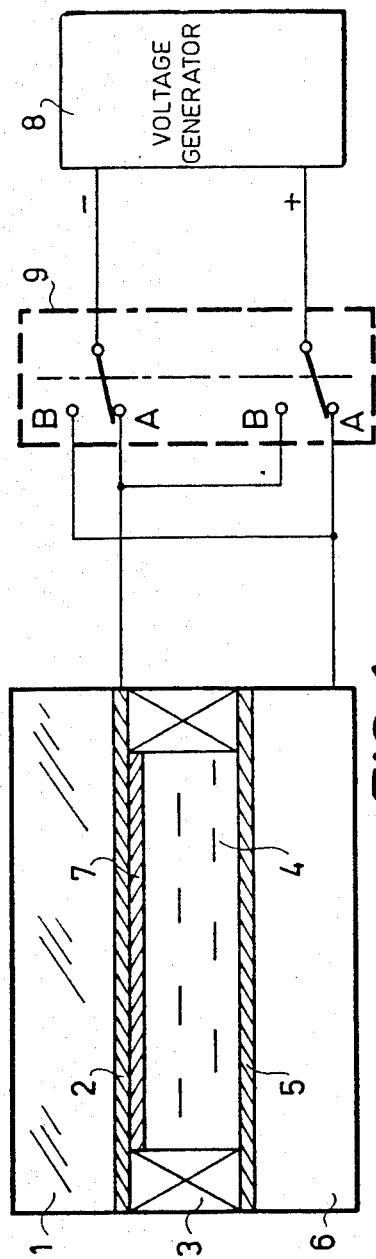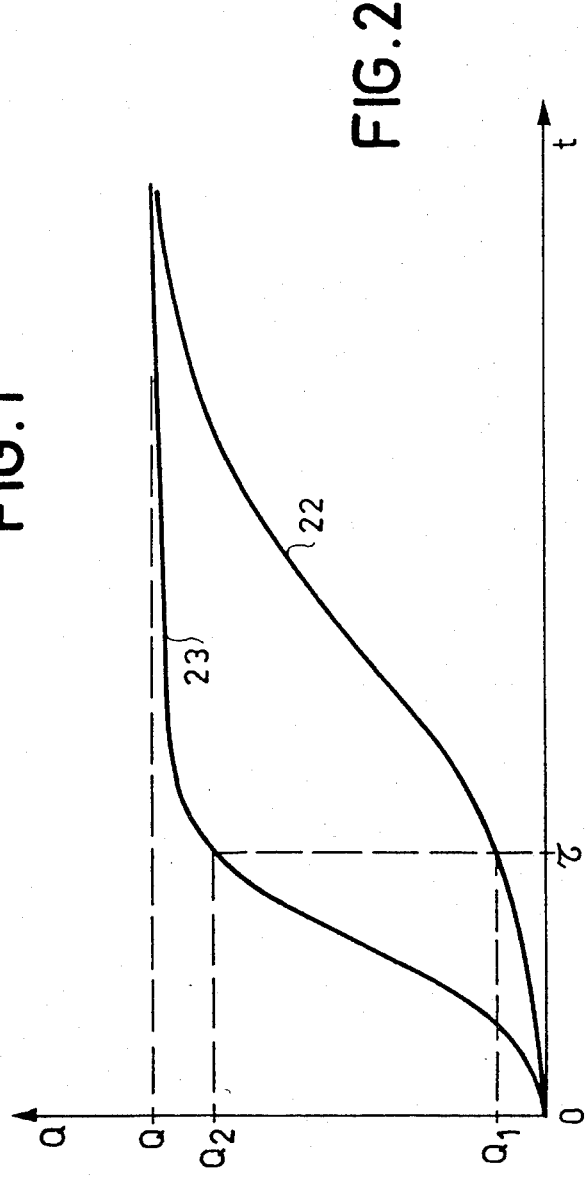

THERMOELECTRICALLY CONTROLLED ELECTROCHROMATIC VISUALIZATION DEVICE

FIELD OF THE INVENTION

The present invention is related to electrochromatic visualization cells, and more particularly to devices having a matrix type access or screen. Such devices are adapted to modulate incident light rays and exhibit excellent contrast properties when very large viewing angles are involved. Furthermore they are characterized by low threshold voltages, which range about 1 Volt. Said devices may also exhibit memory (storing) or persistance capacities, and their power requirements for maintaining information are comparatively low.

BACKGROUND OF THE INVENTION

A material is defined as being "electrochromatic" when its colour changes under the influence of an electric current passing through said material, or under the influence of an electric field. Various physical phenomena are responsable for electrochromatic effects in solids, liquids, organic or inorganic substances.

As regards the solids, most of the electrochromatic phenomena concern the formation of colour centers or the charge transfer between impurity centers, which results in the suppression of an absorption band and the creation of a new band.

As far as the liquids are concerned, the phenomena involved are generally of an electrochemical nature, which has led to designating them by the term of "electrochemichromatic phenomena". Two effects should be mainly considered:

"redox" reactions (i.e. oxidation-reduction reactions) by which non-coloured species are reduced or oxidized so as to form coloured species;

a metallisation effect due to an oxidation-reduction reaction wherein the metal ions will deposit on an electrode so as to form a metallic layer.

The most efficient performances are exibited by systems related to the colour center effect in solids, and to electrochemical oxidation-reduction phenomena in liquids or solids.

The present invention concerns the systems based on the displacement of ions in solids or liquids.

Up to now all the known devices of this type have exhibited two particular features which limit their field of application:

comparatively long response times, which range from a fraction of a second to about one second at ambient temperature;

absence of a clearly defined threshold of the effect, since the resulting optical density is a function of the total charge having passed through the cell, and thus depends on the value of the current and the duration of its application.

The instant invention is aimed at overcoming these two drawbacks. It is based on the fact that the response time is determined by the diffusion of the ions in the material, and that the ion diffusion coefficient is a very "quick" (or steep) function of the exponential type, of temperature. According to the invention, it is proposed, in a visualization device, to heat the electrochromatic material during a short period of time, so as to decrease the duration of application of the control voltage, and thus obtain more quickly acting visualization systems. The heating may be effected by the passage of an electric current through one of the electrodes which serve to apply the control voltage to the electrochromatic material.

SUMMARY OF THE INVENTION

It is thus one main object of the invention to provide an electrically controlled visualization device including an electrochromatic material placed between a first electrode and a second electrode, said electrodes being supported respectively by two plates at least one of which is transparent, and said electrodes being connected to a voltage source adapted to produce a displacement of ions by diffusion which modifies the aspect of the said material, wherein an electric heating current passes through one of said electrodes, the duration of the application of said voltage being selected in such a manner that said displacement is dependant on said current.

The invention and its characteristic features, as well as advantages achieved thereby will be described hereinafter in a more detailed manner, especially with reference to the Figures of the appended drawing; it should be noted that this description and said drawing are given by way of illustration, but not of limitation of the scope of the instant invention.

BRIEF DESCRIPTION OF THE DRAWING

FIG. 1 of the drawing is a sectional view of a cell using the electrochromatic effect;

FIG. 2 is a diagram representing the quantity of migrating ions as a function of time;

DETAILED DESCRIPTION OF PREFERRED EMBODIMENTS OF THE INVENTION

Figure 3:
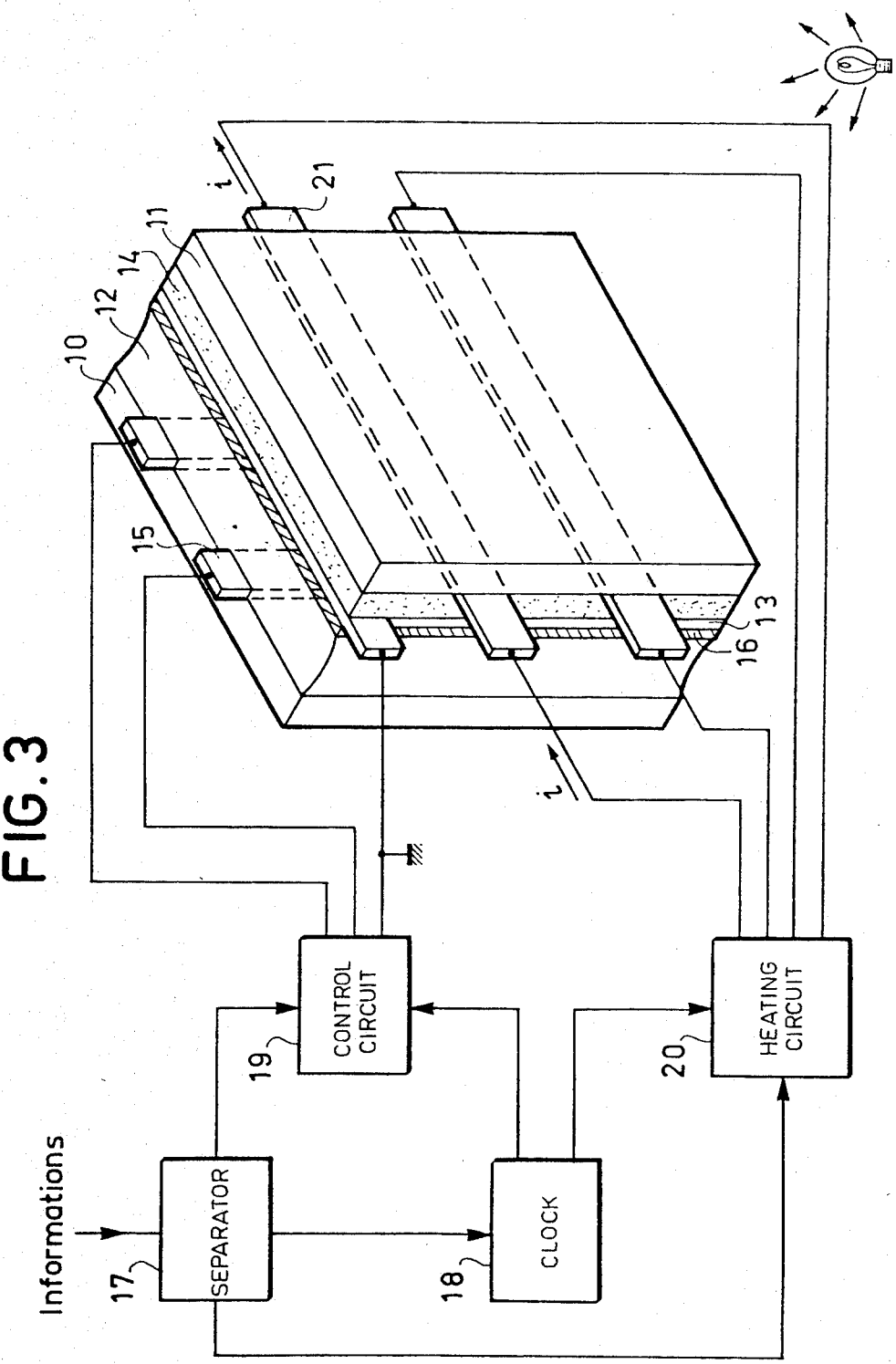
FIG. 3 shows a device according to the invention and the control system associated thereto.

A great number of visualization cells making use of the properties of electrochromatic materials have already been proposed. These known cells use two types of materials. Two types of cells are of particular interest, to wit: the cells using the principle of permanent fixation on the electrode, and the cells using the principle of metal deposition.

In the cells of the first one of the above-mentioned types two electrodes are placed in an electrolyte. A thin layer of an electrochromatic material has been deposited on one of the electrodes in the form of a film having a thickness of 0.1 to 5 microns. This material is a solid substance insoluble in the electrolyte being used. Such materials may be found:

(a) in the group of tungsten brass alloys which change their colour by adjunction of cations, such as $H^+$, $Na^+$ or $Li^+$ in the case of solid electrolytes, or (b) in the group of systems based on iridium oxide or hydroxide.

In the case of tungsten brass the reaction takes place in accordance with the formula:

$$WO_3 + xM^+ + xe^- \rightarrow M_xWO_3$$

wherein $M^+$ is a metallic ion or a proton.

Others systems use organo metallic compounds, such as lutetium diphthalocyanine having the general formula $LuPc_2H$ the functioning of which depends on the anions transfer such as $Cl^-$, $SO_4^=$, $HSO_3^-$, etc.

In the second one of the above-mentioned types of cell the electrochromatic material is dissolved in a reposing electrolyte. The passage of an electric current causes an electrochemical reaction to take place which results in the formation of an insoluble substance which is fixed on one of the electrodes; this is the case of materials generally called "viologens" which are dipyridinium compounds.

FIG. 1 is a sectional view of a cell using the electrochromatic effect. A transparent conductive layer 2 is deposited on a transparent substrate 1, a layer 7 of tungsten trioxide $WO_3$ which is colourless in the repose state having been deposited on said transparent conductive layer 2. A plate 6 supports a conductive layer 5, this sub-assembly constituting a counter-electrode. Plate 6 may be made of stainless steel, and layer 5 may be a carbon film. Spacers 3 define a space wherein an electrolyte 4 is enclosed. The cell is connected to a direct current source 8 through an interposed invertor 9.

The electrochromatic mechanisms involve the phenomenon of double injection of electrons and protons or ions into the $WO_3$ film. When the invertor 9 is in position A the generator feeds electrode 2 with a negative potential, while feeding the counter-electrode with a positive potential. Under these conditions electrons are injected from electrode 2 and ions or protons of the acid electrolyte are injected into the tungsten trioxide film. This process is carried on until the tungsten trioxide $WO_3$ is converted into tungsten brass $M_x WO_3$, which is coloured. Erasing is effected by reversing the polarities, whereby the electrons and the ions are caused to leave the tungsten trioxide film and to return to their initial locations.

The travelling speed of the electrons being higher than that of the ions, the latter will determine the speed of display and erasing.

With a view to avoiding the charge transfer phenomenon in the electrolyte the latter must have a low electric resistivity. This electrolyte may be liquid or solid. The counter-electrode must be so selected that the formation of a potential-barrier is inhibited in the area of contact between said counter-electrode and the electrolyte. Transparent electrode 2, which is made e.g. of mixed indium-and-tin oxide ensures an ohmic contact with the film of electrochromatic material. Its resistance must be low because the system operates under current.

When operating according to the reflection principle the incident light reaching the cell passes through the transparent plate 1, electrode 2 and electrochromatic layer 7 and is reflected either by the electrolyte or the counter-electrode. When the system operates according to the transmission principle a transparent electrolyte and a transparent counter-electrode must be provided.

When a liquid electrolyte is selected, a problem of protecting the electrodes against the effects of the acid environment will arise, especially when the electrolyte contains sulphuric acid.

At ambient temperature the response time $\tau$ of a cell of this type is comparatively long, ranging about one second. It has been found that:

$$\tau = \frac{l^2}{4D}$$

wherein l represents the thickness of the electrochromatic material film, in cm, and D is the coefficient of diffusion of protons or ions in said film, in cm²/sec.

This coefficient is defined by a formula of the following type:

$$D = D_o \cdot \exp\left(\frac{-\Delta E}{kT}\right)$$

wherein $\Delta E$ represents an activation energy. The values of this coefficient D are not well known; it is known however that said coefficient is greater for anions than it is for cations, and that there may exist at least two such coefficients, i.e. a larger one for intergranular diffusion and another one, substantially smaller, for the diffusion in the granules forming the layer. In the case of tungsten trioxide the activation energy equals about 1.2 eV. When the temperature increases from ambient (20° C.) to 100° C., coefficient D is multiplied by about $2.10^4$.

The ions are the particles which determine the colour change. The intensity of this colour change depends on the number of ions which have migrated from the electrolyte to the tungsten trioxide film. FIG. 2 which relates to the cell shown in FIG. 1 shows curves which indicate the trend of the quantity Q of ions which have migrated during a period of time t, the temperature constituting a parameter. Curve 22 represents the function considered for ambient temperature conditions (20° C.), and curve 23 represents said function for a temperature $T + \Delta T = 100°$ C. At the instant, or moment, $t = 0$, i.e. the moment when a negative potential is applied to electrode 2 while a positive potential is applied to the counter-electrode, quantity Q is nil. This quantity increases with time toward an asymptotic value Q. It is seen that for a given duration $\tau$ of application of the control current at a temperature T, the quantity $Q_1$ of ions which have migrated represents about 10% of the quantity of saturation Q. After this same duration $\tau$ and at a temperature $T + \Delta T$ the quantity $Q_2$ represents about 90% of Q. It may admitted that this value represents a satisfactory level of excitation or activation of the cell. If the temperature increase $\Delta T$ did not occur the cell would be after a lapse of time $\tau$ in a state which may be considered as being a repose state. It may also be admitted that the reverse effect of decoloration obtained by reversing the polarities of the control voltage occurs after durations ranging about the same values.

The considerations set forth in the preceding paragraph are used as basis for producing the matrix-type screen shown in FIG. 3. This figure also shows the control system associated to such screen.

The matrix-type screen as shown is defined by two groups of conductors arranged in a mutually and orthogonally intersecting manner, comprising lines connections 21 and columns connections 15, which are supported respectively by two parallel plates 11 and 10. FIG. 3 only shows two lines and two columns with a view to simplifying the figure and providing a clearer understanding of the structure of the device. Furthermore the sealing means for the screen are also omitted in this figure. To this end an epoxy resin may be advantageously used. The space separating the two blades is defined by spacers (not shown). The depth of said space may vary from 0.1 to 10 mm. In the present embodiment the lines connections have been selected for effecting the heating of the electrochromatic material film 16. The incident light reaching the screen first meets the transparent plate 11, then the transparent heating ribbons 21, and the electrically isolating, transparent layer 14; the light then passes through the transparent electrode 13, the electrochromatic layer 16 and reaches the electrolyte 12.

The electrolyte may be solid or liquid. The embodiment shown here uses a solid electrolyte constituted by beta-alumina ($\beta$-Al$_2$O$_3$). Since this material is opaque the device operates by light diffusion. Cells using this electrolyte are based on the phenomenon of displacement of Na$^+$ ions through the beta-alumina. The beta-alumina is used in the form of a blade having a thickness of about 1 mm, on which a layer of tungsten trioxide having a thickness of 0.3 to 1 micron is deposited by vaporisation. A transparent conductive layer 13 is then deposited on said tungsten trioxide layer. Since this conductive layer is in contact with the electrolyte as well as with the tungsten trioxide layer, it must be selected with utmost care. Indeed, the electrode 13 cannot be made of mixed tin-and-indium oxide — which is generally the case when it is desired to provide a transparent electrode—but should rather be made of tin oxide (SnO$_2$) which is a very stable substance. It may be deposited by pyrolitic decomposition of tin tetrachloride solutions. Antimony trichloride may be added as a doping substance with a view to increasing the conductivity of the material.

Columns 15 constitute the counter-electrode of the screen. They are formed by depositing tungsten brass of the formula Na$_x$WO$_3$, wherein x has a value of about 0.2. Optionally another tungsten trioxide layer may be deposited on the columns, so as to provide a symmetrical system. The Na$^+$ ions then migrate from one electrochromatic layer to another one, depending on the polarity of the voltage which is applied.

While layer 14 is made of an electrically isolating material it must be a good heat conductor. To this end glucine (berrylium oxide) may be used. Plate 11 is made of an isolating and transparent material. It may be made of glass, which also applies to plate 10.

The lines connections 21 are transparent heating bands or ribbons. Advantageously they are made of mixed tin-and-indium oxide and deposited by a photolithographic process.

The incident electric signal representing the letters or the pattern to be displayed is first received by a circuit 17 which separates the signal related to the lines from those related to the columns. The signals enable to apply the control voltages to each screen element geometrically defined by the intersection of a line and a column; these signals are transmitted to a circuit 19 including a buffer memory. The above-mentioned control voltages are applied at a convenient time across columns 15 and electrode 13 which is grounded. The signals corresponding to the control of the heating current i which passes successively through each one of the lines are transmitted to the heating circuit 20. A clock-circuit 18 allows the electric control signals to be coordinated by acting on circuits 19 and 20 in accordance with the operations effected by separating circuit 17. The succession of operations is as follows: at first, the heating of one line while the control voltages of the elements of said line are stored in the buffer memory of circuit 19, then the application of the control voltages across the columns and electrode 13. The consecutive operation consists in commuting the heating current i to the following line. When passing through a line connection current i causes the same to be heated. The heat thus produced is transmitted through layer 14 and electrode 13 to that portion of electrochromatic layer 16 which faces the heated line. The heating brings about an increase of the ion diffusion coefficient in the electrochromatic material and consequently an increase of the response time $\tau$ of the device.

Electrode 13 acts as a screen between the video voltages applied to the columns and the line heating voltages. The latter may be high as compared to the video voltages, and in the absence of electrode 13 interferences might occur between the voltages required for the heating and the video voltages. Indeed in the case of a direct vision screen the sides of which have a length of 10 cm and the line connections of which have a width of 0.325 mm, the line heating power ranges about 15 W and when using ITO ribbons having a low resistance, the heating voltages (as measured at the terminals of each line) may reach values ranging about 80 V.

During display, electrode 13 may be connected to the ground potential. During erasing, it may be brought to a positive potential with reference to the entirety of the columns.

Layer 14 serves to isolate electrically the heating lines from the counter-electrode 13. Said layer is made of glucine, and its thickness should be sufficient to avoid the building-up of rupture voltages which might occur between line connections 21 and electrode 13. The rupture voltage of commercially available glucine is about 20 kV/mm. The thickness of layer 14 thus should be greater than 4 microns, so as to enable said layer to withstand the voltages prevailing on each one of its faces.

The video voltages act on the heated lines elements, thus allowing the image or pattern to be displayed. Due to the uniformity of electrode 13 and the low resistance of the electrolyte these voltages also act on the non-heated lines elements, but they do so far more slowly. This cumulative parasitic effect has no importance, provided that the number N of lines of the screen remains substantially lower than the ratio of $D_{T\ max}/D_{T\ ave}$, with $D_{T\ max}$=ion diffusion coefficient at the maximum temperature to which layer 16 is heated (display temperature), and $D_{T\ ave}$=ion diffusion coefficient at ambient temperatures. In other words, the increase of the temperature of the lines must be stronger when the number N of lines is greater.

Within the scope of the invention, electrochromatic materials other than tungsten trioxide may be used, for example iridium oxide or hydroxide, organo-metallic compounds such as lutetium diphthalocyanine etc. Other electrolytes may also be used, e.g. electrolytes on the basis of lithium nitride and fluoride, and they may correspond to the following schema: ITO electrode/-WO$_3$/LiF/Li$_3$N/LiF/Ni (counter-electrode).

It is also within the scope of the invention to produce a screen operating according to the transmission principle. In this case the components of the screen must be transparent.

The visualization device according to the invention, including an electrochromatic screen, is advantageous, i.e., in that its response time is substantially shorter than that of the conventional systems having an electrochromatic screen, one major drawback of the latter residing in the fact that their response time ranges about one second.

The invention is not limited to the embodiments shown and described herein-above; many modifications and variants may be envisaged by those skilled in the art without departing from the spirit and scope of the invention, particularly as defined in the appended claims.

What is claimed is:

1. A electrically controlled visualization device comprising:
   an electrochromatic material placed between a first electrode means and a second electrode means wherein said first and second electrode means are each supported respectively by two plates with at least one of said plates being transparent;
   a voltage source connected to said first electrode means;
   heating current generating means for producing an electric heating current provided for said second electrode means whereby said voltage source and said heating current generating means produce a displacement of ions by diffusion which modifies the nature of said material;
   control means connected to said voltage source and said heat current generating means for controlling the application of said voltage and said current from said heat current generating means in order to provide for control of an electrochromatic effect caused by said displacement of ions by diffusion.

2. A device according to claim 1 wherein said first electrode means comprises a first group of electrodes and said second electrode means comprises a second group of electrodes with said groups being arranged in a mutually intersecting manner.

3. A device according to claim 1 further comprising means for reversing the polarities of said voltage source in order to provide displaying and erasing operations.

4. A device according to claim 1, wherein said electrochromatic material is constituted by an electrochromatic layer and an electrolyte.

5. A device according to claim 4, wherein said plates, said electrodes and said electrolyte are transparent.

6. A device according to claim 4 further comprising a third transparent electrode disposed between said electrochromatic layer and said second electrode means;
   an electrically isolating transparent material disposed between said second electrode means and said third transparent electrode wherein said electrically isolating transparent material is a heat conducting material and wherein said voltage source is applied across said first electrode means and said third transparent electrode.

* * * * *